(12) United States Patent
Gruene et al.

(10) Patent No.: US 11,707,846 B2
(45) Date of Patent: Jul. 25, 2023

(54) APPARATUS HAVING A FIRST AND A SECOND ROBOT AND METHOD FOR OPERATION THEREOF

(71) Applicant: HELLA GmbH & Co. KGaA, Lippstadt (DE)

(72) Inventors: Ludger-Josef Gruene, Lippstadt (DE); Miguel Lebrato-Rastrojo, Paderborn (DE); Thomas Albert Roebbecke, Erwitte (DE); Jun Yue, Zhejiang (CN)

(73) Assignee: Hella GmbH & Co. KGaA, Lippstadt (DE)

( * ) Notice: Subject to any disclaimer, the term of this patent is extended or adjusted under 35 U.S.C. 154(b) by 297 days.

(21) Appl. No.: 17/202,106

(22) Filed: Mar. 15, 2021

(65) Prior Publication Data

US 2021/0197385 A1 Jul. 1, 2021

Related U.S. Application Data

(63) Continuation of application No. PCT/EP2019/074057, filed on Sep. 10, 2019.

(30) Foreign Application Priority Data

Sep. 14, 2018 (DE) ............... 10 2018 122 499.0

(51) Int. Cl.
*B25J 15/04* (2006.01)
*B25J 9/16* (2006.01)
(Continued)

(52) U.S. Cl.
CPC ........... *B25J 9/1682* (2013.01); *B25J 9/0084* (2013.01); *B25J 11/005* (2013.01); *B25J 15/0019* (2013.01); *B25J 15/04* (2013.01)

(58) Field of Classification Search
CPC .... B25J 11/005; B25J 15/0019; B25J 9/1682; B25J 15/0052; B25J 15/04; B25J 9/0096; B25J 9/0084
See application file for complete search history.

(56) References Cited

U.S. PATENT DOCUMENTS 6,612,011 B2 9/2003 Mayr et al.
7,103,955 B2 * 9/2006 Murai ................. B23Q 41/02
29/418

(Continued)

FOREIGN PATENT DOCUMENTS

DE 29813669 U1 12/1999
DE 102007022102 A1 11/2008
(Continued)

OTHER PUBLICATIONS

Reinhart et al., A generic framework for workpiece-based programming of cooperating industrial robots, 2009, IEEE, p. 37-42 (Year: 2009).*

(Continued)

*Primary Examiner* — McDieunel Marc
(74) *Attorney, Agent, or Firm* — Muncy, Geissler, Olds & Lowe, P.C.

(57) ABSTRACT

A first robot for handling at least one first workpiece in a first processing operation of the apparatus, a second robot cooperating with the first robot for processing the at least one first workpiece in the first processing operation, and at least one first workpiece holder for holding the at least one first workpiece during the first processing operation. In order to improve robot-assisted processing of workpieces which differ from one another, the first robot handles at least one second workpiece and the second robot processes the at least one second workpiece in a second processing operation of the apparatus. The first robot or the second robot in order, in a changeover operation of the apparatus, to replace the at (Continued)

least one first workpiece holder automatically by at least one second workpiece holder for holding the at least one second workpiece during the second processing operation.

15 Claims, 1 Drawing Sheet

(51) Int. Cl.
*B25J 9/00* (2006.01)
*B25J 11/00* (2006.01)
*B25J 15/00* (2006.01)

(56) References Cited

U.S. PATENT DOCUMENTS

| | | | |
|---|---|---|---|
| 9,724,801 B2 | 8/2017 | Gu | |
| 10,377,002 B2 * | 8/2019 | Mori | B23K 26/342 |
| 10,471,603 B2 * | 11/2019 | Yuelai | B25J 9/1674 |
| 10,556,306 B2 | 2/2020 | Akiyama et al. | |
| 10,611,027 B2 | 4/2020 | Kobori et al. | |
| 10,723,023 B2 * | 7/2020 | Inoue | B23K 37/0443 |
| 10,814,479 B2 * | 10/2020 | Sandhu | B25J 9/1612 |
| 10,919,709 B2 * | 2/2021 | Mattern | B25J 9/1612 |
| 10,987,799 B2 * | 4/2021 | Kashiwagi | G05B 19/42 |
| 11,052,500 B2 * | 7/2021 | Lachenmeier | B25J 9/00 |
| 11,052,536 B2 * | 7/2021 | Jetté | B23Q 1/5462 |
| 11,235,387 B2 * | 2/2022 | Mori | B23P 23/04 |
| 11,439,484 B2 * | 9/2022 | Rohner | A61C 13/0022 |
| 11,498,173 B2 * | 11/2022 | Niebur | B27M 1/08 |
| 11,504,851 B2 * | 11/2022 | Crothers | B25J 13/088 |
| 2005/0189399 A1 | 9/2005 | Kilibarda | |
| 2017/0368649 A1 | 12/2017 | Marrocco et al. | |

FOREIGN PATENT DOCUMENTS

| | | |
|---|---|---|
| DE | 102014108956 A1 | 12/2014 |
| DE | 102014014361 A1 | 3/2016 |
| DE | 102017120116 A1 | 3/2018 |
| EP | 3388190 A1 | 10/2018 |
| JP | 2002370679 A | 12/2002 |
| WO | WO2008087702 A1 | 7/2008 |

OTHER PUBLICATIONS

Jinno et al., Teaching-less robot system for finishing workpieces of various shapes using force control and computer vision, 1999, IEEE, p. 573-578 (Year: 1999).*
Spiller et al., Superimposed Force/Torque-Control of Cooperating Robots, 2010, IEEE, p. 531-537 (Year: 2010).*
Bobrow et al., Minimum-time trajectories for two robots holding the same workpiece, 1990, IEEE, p. 3102-3107 (Year: 1990).*
International Search Report dated Dec. 19, 2019 in corresponding application PCT/EP2019/074057.

* cited by examiner

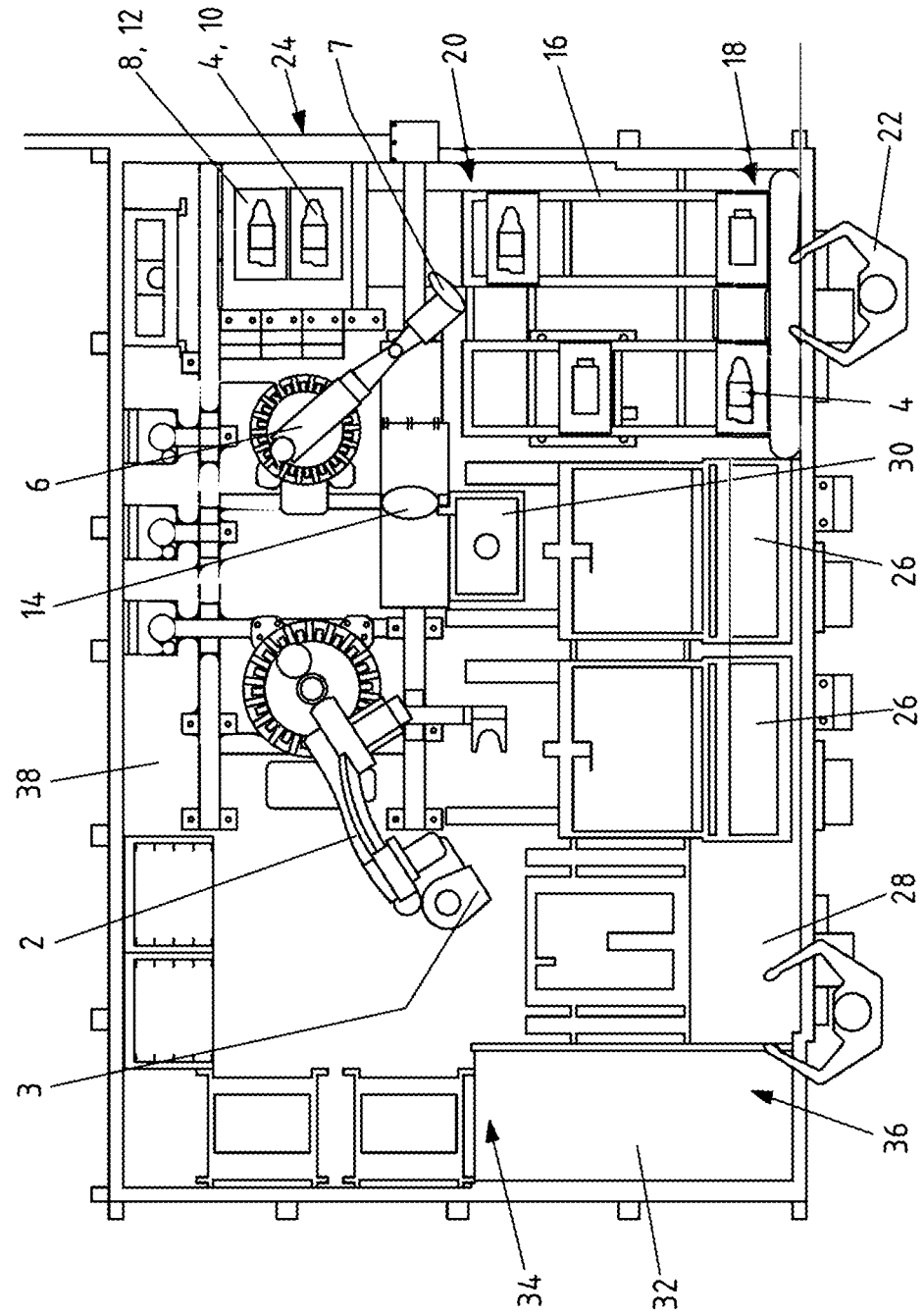

APPARATUS HAVING A FIRST AND A SECOND ROBOT AND METHOD FOR OPERATION THEREOF

This nonprovisional application is a continuation of International Application No. PCT/EP2019/074057, which was filed on Sep. 10, 2019 and which claims priority to German Patent Application No. 10 2018 122 499.0, which was filed in Germany on Sep. 14, 2018 and which are both herein incorporated by reference.

BACKGROUND OF THE INVENTION

Field of the Invention

The present invention relates to an apparatus, comprising a first robot and a second robot cooperating with the first robot, and a method for operating the apparatus.

Description of the Background Art

An apparatus and methods for operating the apparatus are already known from the prior art.

For example, DE 10 2014 014 361 A1 discloses an apparatus and a method for manufacturing a complex product in which two cooperating robots are used. In order to improve the accessibility of working positions on the complex product, it is proposed to receive a workpiece using the two cooperating robots and to bring it into a predetermined pose, wherein another robot then performs a point application on the workpiece while the pose is maintained by the other two robots.

SUMMARY OF THE INVENTION

It is therefore an object of the present invention to improve robot-assisted processing of workpieces which differ from one another.

This object is achieved by an apparatus comprising a first robot for handling at least one first workpiece in a first processing operation of the apparatus, a second robot cooperating with the first robot for processing the at least one first workpiece in the first processing operation, and at least one first workpiece holder for receiving the at least one first workpiece during the first processing operation, characterized in that the first robot is designed and configured for handling at least one second workpiece and the second robot is designed and configured for processing the at least one second workpiece in a second processing operation of the apparatus, wherein the first robot and/or the second robot is/are designed and configured, during a changeover operation of the apparatus, to replace the at least one first workpiece holder automatically by at least one second workpiece holder for receiving the at least one second workpiece.

Furthermore, the object is achieved by a method for operating an apparatus, according to which during a first processing operation of the apparatus, an automatic handling of at least one first workpiece by means of a first robot, an automatic processing of the at least one first workpiece by means of a second robot cooperating with the first robot and picking up the at least one first workpiece by means of at least one first workpiece holder takes place, whereafter, during a changeover operation of the apparatus, the first and/or the second robot automatically replace the at least one first workpiece holder by at least one second workpiece holder, and whereafter, during a second processing operation of the apparatus, the first robot automatically handles the at least one second workpiece, the second robot cooperating with the first robot automatically processes the at least one second workpiece, and the at least one second workpiece holder receives the at least one second workpiece.

A substantial advantage of the invention is, in particular, that the two cooperating robots do not only cooperate during a first processing operation of the apparatus and/or a second processing operation of the apparatus, but cooperate with each other in a first processing operation and in a second processing operation as well as in a changeover operation of the apparatus, namely cooperate with each other in the changeover operation in such a way that the replacement of the at least one first workpiece holder for the at least one second workpiece holder is carried out automatically solely by means of at least one of the cooperating robots. In this way, user intervention, for example by a machine operator or the like, can be reduced to a minimum not only during a first processing operation and/or a second processing operation, but user interventions can be reduced to a minimum during the first and the second processing operation as well as during the changeover operation of the apparatus as a whole. It is clear to the person skilled in the art that the changeover operation according to the invention includes, in an analogous manner, the automatic replacement of the at least one second tool holder by the at least one first tool holder.

Accordingly, the operating speed of the apparatus and thus the processing of the individual workpieces is significantly accelerated. In particular, the otherwise usual changeover operation with the corresponding interventions of at least one user slows down the operating speed of apparatus of this type. Also, the changeover operation by means of at least one of the two cooperating robots alone enables higher accuracy and thus higher quality during the changeover operation, for example during the positioning of the at least one first and the at least one second workpiece holder. In addition, the automated changeover operation by means of at least one of the two cooperating robots significantly reduces the need for personnel.

Furthermore, for their operation, the apparatus according to the invention and the method according to the invention are freely scalable within wide suitable limits. For example, the invention includes that by means of the apparatus according to the invention and the method according to the invention, an almost arbitrary number of different workpieces and thus products can be processed within the technical limits in one processing operation of the apparatus, since the inventive changeover operation of the apparatus can be used for an almost arbitrary number of different n workpieces within the technical limits, i.e. at least one first workpiece, at least one second workpiece, at least one third workpiece and so on until at least one nth workpiece.

In principle, the first robot for handling the at least one first workpiece and the at least one second workpiece and the second robot for processing the at least one first workpiece and the at least one second workpiece can be freely selected in terms of type, mode of operation, material, dimensioning and arrangement within wide suitable limits.

The second robot can be additionally designed and configured for handling the at least one first workpiece and/or the at least one second workpiece. In this way, it is possible to free up the first robot with regard to the handling of the at least one first workpiece and/or the at least one second workpiece and/or with regard to the changeover operation of the apparatus in the handling of the at least one first workpiece holder and/or the at least one second workpiece holder. Accordingly, the operating speed of the apparatus according to the invention can be further increased.

The same applies to an advantageous further development of the method according to the invention, which is characterized in that the second robot uses its handle to additionally handle the at least one first workpiece and/or the at least one second workpiece.

The first robot and/or the second robot can have a tool holder designed as a tool changer for tools which differ from another. This improves the flexibility of the first and/or the second robot. By means of the tool changer, it is possible for the respective robot to automatically exchange tools which differ from another, i.e., without the need for user intervention. Accordingly, the degree of automation in the apparatus according to the invention is further increased. For example, for the changeover operation of the apparatus, the respective robot can automatically replace the tool required for the first processing operation or the tool required for the second processing operation by a tool required for the changeover operation.

The first robot and/or the second robot can have a tool holder designed as a multiple holder for a plurality of tools which differ from another. In this way, it is possible, for example, to process two complementary first and/or second workpieces without having to process a changeover of the apparatus. The complementary workpieces can be, for example, a left and a right automobile headlight or a left and a right automobile taillight.

The apparatus can have a separate processing tool for processing the at least one first workpiece in the first processing operation and the at least one second workpiece in the second processing operation, and the second robot has at least one tool designed as a positioner, wherein the second robot can use the positioner to statically or dynamically position the at least one first workpiece in the first processing operation and the at least one second workpiece in the second processing operation relative to the processing tool for processing by said processing tool. This makes it possible to position the processing tool in a stationary manner, i.e. fixed, in the apparatus. Accordingly, feed lines to the processing tool do not have to be moved, as would be the case if the processing tool were designed as a tool of the second robot. For example, the separate processing tool could be a bonding tool for applying adhesive to the at least one first and/or the at least one second workpiece.

The same applies to an advantageous further development of the method according to the invention, which is characterized in that the second robot statically or dynamically positions the at least one first workpiece in the first processing operation and the at least one second workpiece in the second processing operation relative to a separate processing tool of the apparatus for processing by said processing tool.

The positioner comprises a frame which encloses at least one of the at least one first workpieces in the first processing operation and at least one of the at least one second workpieces in the second processing operation. In this way, safe handling of the at least one first workpiece and the at least one second workpiece during their static or dynamic positioning relative to the separate processing tool is made possible while at the same time providing good accessibility to the respective workpiece.

The first robot and the second robot can be positioned relative to one another in such a way that, in the first processing operation and/or the second processing operation and/or the changeover operation, the first robot and the second robot occupy at least partially the same base area when viewed from a bird's eye view. This provides a compact and thus space-saving apparatus. In addition, the spatial concentration of the two cooperating robots improves the accessibility of the rest of the apparatus and thus the accessibility of the at least one first and the at least one second workpiece.

The same applies to an advantageous development of the method according to the invention, which is characterized in that the first robot and the second robot are operated in the first processing operation and/or the second processing operation and/or the changeover operation in such a way that the first robot and the second robot occupy at least partially the same base area when viewed from a bird's eye view.

The first robot and the second robot can be designed and configured in such a way that, in the first processing operation and/or the second processing operation and/or the changeover operation, the first robot operates over the second robot or the second robot operates over the first robot. In this way, the two cooperating robots can be spatially concentrated as far as possible in a simple design.

The same applies to an advantageous development of the latter embodiment of the method according to the invention, which is characterized in that the first robot and the second robot are operated in the first processing operation and/or the second processing operation and/or the changeover operation in such a way that the first robot operates over the second robot or the second robot operates over the first robot.

The first robot and/or the second robot can be designed and configured in such a way that the at least one first workpiece holder and/or the respective tool holder and/or the respective tool is/are automatically fed to a user, for a user action, during the first processing operation, and/or the at least one second workpiece holder and/or the respective tool holder and/or the respective tool are fed during the second processing operation and/or the respective tool holder and/or the respective tool are fed during the changeover operation. This further improves the flexibility of the apparatus according to the invention.

The same applies to a particularly advantageous development of the method according to the invention, which is characterized in that the first robot and/or the second robot automatically feeds the at least one first workpiece holder and/or the respective tool holder and/or the respective tool to a user, for a user action, during the first processing operation, and/or feeds the at least one second workpiece holder and/or the respective tool holder and/or the respective tool during the second processing operation, and/or feeds the respective tool holder and/or the respective tool during the changeover operation.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE shows an exemplary embodiment of an apparatus according to the invention from a bird's eye view.

DETAILED DESCRIPTION

The FIGURE shows an exemplary embodiment of an apparatus according to the invention. The apparatus comprises a first robot 2 for handling at least one first workpiece 4 in a first processing operation of the apparatus, a second robot 6 cooperating with the first robot 2 for processing the at least one first workpiece 4 in the first processing operation, and at least one first workpiece holder 8 for holding the at least one first workpiece 4 during the first processing operation. The at least one first workpiece 4 is formed as a left automotive headlight, comprising a left headlight housing and a left cover lens. Accordingly, in the present exemplary embodiment, there are a total of two first workpieces 4, namely the left headlight housing and the left cover lens. For handling the at least one first workpiece 4, the first robot 2 has a handle 3. The second robot 6 has a positioner 7 designed as a handle for processing the at least one first workpiece 4. The handle 7 will be explained in more detail below.

Furthermore, the first robot 2 is designed and configured for handling at least one second workpiece 10 and the second robot 6 is designed and configured for processing the at least one second workpiece 10 in a second processing operation of the apparatus, wherein in the second processing operation of the apparatus the at least one second workpiece 10 can be received by means of at least one second workpiece holder 12. The at least one second workpiece 10 is formed as a right automobile headlight, comprising a right headlight housing and a right cover lens. Accordingly, in the present exemplary embodiment, there are a total of two second workpieces 10, namely the right headlight housing and the right cover lens. For handling the at least one second workpiece 10, the handle 3 of the first robot 2 is also used. For processing the at least one second workpiece 10, the handle 7 of the second robot 6 is also used.

The FIGURE illustrates both the first processing operation and the second processing operation of the apparatus at a specific point in time during the respective processing operation of the apparatus. The reference symbols corresponding only to the first or the second processing operation are separated from each other by a semicolon. The following exemplary explanations of the invention, which refer to the FIGURE, are to be understood accordingly.

The first robot 2 and the second robot 6 are also designed and configured, for holding the at least one second workpiece 10 during the second processing operation in a changeover operation of the apparatus (not shown), to replace the at least one first workpiece holder 8 automatically by the at least one second workpiece holder 12. To this end, the first robot 2 and the second robot 6 each have a tool holder, not shown, designed as a tool changer for tools which differ from another. By means of this tool changer, the first robot 2 can, in addition to the handle 3, also automatically receive other tools, for example a tool for the changeover operation of the apparatus. The same applies to the second robot 6, which can also automatically receive other tools by means of its tool changer, in addition to the handle 7, for example a tool for the changeover operation of the apparatus. In the present embodiment, the first robot 2 and the second robot 6 each have a changeover tool suitable for the changeover operation of the apparatus, which is not shown. The changeover tools are explained in more detail below.

Furthermore, the inventive apparatus according to the present exemplary embodiment comprises a separate processing tool 14 for processing the at least one first workpiece 4 in the first processing operation and the at least one second workpiece 10 in the second processing operation, wherein the handle 7 of the second robot 6 has a frame, not shown, which in the first processing operation encloses at least one of the at least one first workpieces 4, namely the left headlight housing, and in the second processing operation encloses at least one of the at least one second workpieces 10, namely the right headlight housing. By means of the second robot 6 and its handle 7, the at least one first workpiece 4, namely the left headlight housing, is dynamically positionable in the first processing operation and the at least one second workpiece 10, namely the right headlight housing, is dynamically positionable in the second processing operation for processing by the separate processing tool 14 relative to said processing tool 14. The separate processing tool 14 is fixed in the apparatus, i.e. fixed in position, and is designed as an adhesive application tool. By means of the adhesive application tool, an adhesive can be introduced into a groove of the left headlight housing during the first processing operation and into a groove of the right headlight housing during the second processing operation.

The second robot 6 with the handle 7 is further designed and configured in such a way that the second robot 6 with the handle 7 additionally does not only position the at least one first workpiece 4, namely the left headlight housing, in the first processing operation and the at least one second workpiece 10, namely the right headlight housing, in the second processing operation relative to the separate processing tool 14, but inserts the respective at least one first or second workpiece 4, 10, during the corresponding first or second processing operation of the apparatus and after the application of the adhesive, into one of the first workpiece holders 8 corresponding to the at least one first workpiece 4 or into one of the second workpiece holders 12 corresponding to the at least one second workpiece 10.

As can be seen from the FIGURE in conjunction with the following description of the method according to the invention, the first robot 2 and the second robot 6 are positioned relative to one another in such a way that the first robot 2 and the second robot 6 occupy at least partially the same base area when viewed from a bird's eye view in the first processing operation, the second processing operation and the changeover operation. To make this possible in an efficient and structurally simple manner, the first robot 2 and the second robot 6 are designed and configured in such a way that in the first processing operation, the second processing operation and the changeover operation, the first robot 2 operates over the second robot 6. The second robot 6 is smaller than the first robot 2 for this purpose.

The apparatus also has a first conveyor belt 16 for conveying the at least one first workpiece 4 in the first processing operation and the at least one second workpiece 10 in the second processing operation from a loading position 18 to an unloading position 20. For this purpose, a total of four further first workpiece holders 8 are arranged on the first conveyor belt 16 in the first processing operation and a total of four further second workpiece holders 12 are arranged in the second processing operation.

In a tacker position 24 of the apparatus, the first workpiece holder 8 mentioned above is positioned in the first processing operation and the second workpiece holder 12 mentioned above is positioned in the second processing operation. These first and second workpiece holders 8, 12 are not only designed to receive the at least one first and second workpiece 4, 10, but additionally have at least one tacker tool, not shown, which will be described in more detail below.

Furthermore, the apparatus comprises two identical function test stations 26 for testing the at least one first and second workpieces 4, 10 for their electrical and optical function, and a leak test station 28 for testing the at least one first and second workpieces 4, 10 for their leak tightness.

A buffer station 30 is arranged between the tacker position 24 and the test stations 26, 28 in order to compensate for different cycle times at the respective positions and stations of the apparatus.

At the aforementioned stations of the apparatus according to the present exemplary embodiment, namely the test stations 26, 28 and the buffer station 30, there are in each case further first workpiece holders 8 in the first processing operation and further second workpiece holders 12 in the second processing operation of the apparatus.

In addition to the first conveyor belt 16, the apparatus has a second conveyor belt 32 for conveying the at least one first workpiece 4 in the first processing operation and the at least one second workpiece 10 in the second processing operation from a loading position 34 to an unloading position 36.

For the changeover operation of the apparatus, the latter has a deposit station 38 for the at least one first workpiece holder 8, the at least one second workpiece holder 12, the changeover tools of the robots 2, 6 and the handles 3, 7 of the robots 2, 6.

In the following, the method according to the invention will be explained in more detail with reference to the present exemplary embodiment and to the figure.

In the first processing operation, the user 22 loads the first conveyor belt 16 with the at least one first workpiece 4, namely alternating with the left headlight housing and the left cover lens. For this purpose, the user 22 inserts the at least one first workpiece 4 into the first workpiece holder 8 located in the loading position 18. The at least one first workpiece 4 is conveyed to the unloading position 20 by means of the first conveyor belt 16. In the unloading position 20, the second robot 6 grips the left headlight housing with its handle 7 and dynamically positions it relative to the separate processing tool 14, namely the adhesive application tool, in such a way that the separate processing tool 14 can fill the adhesive into the groove of this left headlight housing. As explained above, for this purpose the handle 7 has a frame which, in the first processing operation, encloses at least one of the at least one first workpieces 4, namely the left headlight housing, and, in the second processing operation, encloses at least one of the at least one second workpieces 10, namely the right headlight housing. In this way, safe handling of the at least one first and the at least one second workpiece 4, 10 during their dynamic positioning relative to the separate processing tool 14 is made possible with simultaneous good accessibility of the respective workpiece 4, 10.

After the groove has been filled with adhesive in the desired and predefined manner, the second robot 6 uses its handle 7 to transport this left headlight housing to the tacker position 24 and inserts this left headlight housing into the first workpiece holder 8 positioned in the tacker position 24. At approximately the same time, the first robot 2 uses its handle 3 to grip the left cover lens following this left headlight housing on the first conveyor belt 16 in the unloading position 20 and also transports this left cover lens to the tacker position 24 and presses this left cover lens with a web of this left cover lens into the groove filled with adhesive of the left headlight housing already in the tacker position 24. The first workpiece holder 8 positioned in the tacker position 24 serves on the one hand as an abutment for the two aforementioned workpiece holders 4 during their bonding by the adhesive. On the other hand, this first workpiece holder 8 has the above-mentioned at least one tacker tool, by means of which the aforementioned left cover lens is positively connected, namely by a plurality of tacker needles, to the aforementioned left headlight housing in addition to the adhesive connection.

The two first workpieces 4 connected in the manner explained above are then transported from the tacker position 24 to the buffer station 30 by means of the first robot 2 and its handle 3. As soon as one of the two function test stations 26 is free, the first robot 2 uses its handle 3 to transport these two interconnected first workpieces 4 from the buffer station 30 to the free function test station 26. After an electrical and optical function test in this function test station 26, the first robot 2 uses its handle 3 to transport the two interconnected first workpieces 4 from this function test station 26 to the leak test station 28 for a leak test. Since the leak test requires considerably less time than the aforementioned function test, two function test stations 26 are provided in the present embodiment of the apparatus according to the invention. However, this is not mandatory, but is suitably configured by the skilled person depending on the requirements of the individual case.

After the leak test is completed, the first robot 2 uses its handle 3 to transport the two interconnected first workpieces 4 from the leak test station 28 to the loading position 34 of the second conveyor belt 32 and deposits the two interconnected first workpieces 4 on the second conveyor belt 32. By means of the second conveyor belt 32, the two interconnected first workpieces 4 are transported from this loading position 34 to the unloading position 36, from where the user 22 can remove the two interconnected first workpieces 4, namely the left headlight formed by the interconnected left headlight housing and the left cover lens.

For the sake of clarity, only the run of a single left headlight has been shown as an example. In reality, however, the individual transport processes, the connection of two corresponding first workpieces 4, namely mutually corresponding left headlight housings and left cover lenses, and the testing of the interconnected first workpieces 4 for different pairings of first workpieces 4 are performed essentially simultaneously. Accordingly, depending on the requirements of the individual case, as is also the case in the present exemplary embodiment, two function test stations 26 are required, for example, with only a single leak test station 28, as well as one buffer station 30.

For filling the at least one tacker tool at the tacker position 24, it may be provided that the first robot 2 or the second robot 6 is designed and configured to automatically feed the at least one first workpiece holder 8 to a user 22, for a user action, during the first processing operation and the at least one second workpiece holder 12 during the second processing operation, namely the loading of the at least one tacker tool with tacker needles.

If a right headlight with a right headlight housing and a right cover lens is to be processed on the inventive apparatus according to the present exemplary embodiment in the manner explained above with reference to a left headlight, it is first necessary to process the apparatus in the changeover operation of the apparatus.

In the changeover operation of the apparatus, the robots 2, 6 are automatically controlled in such a way that the at least one first workpiece holder 8 is automatically replaced by the at least one second workpiece holder 12 by the first and second robots 2, 6.

For this purpose, the robots 2, 6 first deposit their respective handles 3, 7 at the deposit station 38 of the apparatus and then take the respective changeover tool from the deposit station 38 of the apparatus. This is possible because the robots 2, 6 each have the tool holder described above, which is designed as a tool changer. Using the respective changeover tool, the robots 2, 6 grasp the at least one first workpiece holder 8 and deposit it at the deposit station 38 of the apparatus and then take the at least one second workpiece holder 12 and position it in a manner analogous to the at least one first workpiece holder 8. Accordingly, during the changeover operation of the apparatus, all first workpiece holders 8 are replaced by respective correlating second workpiece holders 12.

Subsequently, the robots 2, 6 deposit their respective changeover tool at the deposit station 38 of the apparatus and then pick up the respective handle 3, 7 from the deposit station 38 of the apparatus again. In principle, however, it is conceivable in other embodiments of the invention that the first and second robots pick up and use different handles or tools depending on the respective processing operation.

Due to the fact that the present exemplary embodiment involves the processing of a left headlight and a right headlight of a single automobile type, the at least one first workpiece 4 and the at least one second workpiece 10 are designed as mirror images of each other, but are otherwise identical. Accordingly, the at least one first workpiece holder 8 and the at least one second workpiece holder 12 are mirror images of each other, but otherwise identical.

The second processing operation for processing the at least one second workpiece 10 is performed analogously to the processing of the at least one first workpiece 4 already described.

In the second processing operation, the user 22 loads the first conveyor belt 16 with the at least one second workpiece 10, namely alternating with the right headlight housing and the right cover lens. For this purpose, the user 22 inserts the at least one second workpiece 10 into the second workpiece holder 12 located in the loading position 18. The at least one second workpiece 10 is conveyed to the unloading position 20 by means of the first conveyor belt 16. In the unloading position 20, the second robot 6 grips the right headlight housing with its handle 7 and dynamically positions it relative to the separate processing tool 14, namely the adhesive application tool, in such a way that the separate processing tool 14 can fill the adhesive into the groove of this right headlight housing.

After the groove has been filled with adhesive in the desired and predetermined manner, the second robot 6 uses its handle 7 to transport this right headlight housing to the tacker position 24 and inserts this right headlight housing into the second workpiece holder 12 positioned in the tacker position 24. At approximately the same time, in the unloading position 20, the first robot 2 uses its handle 3 to grip the right cover lens following this right headlight housing on the first conveyor belt 16 and also transport this right cover lens to the tacker position 24 and press this right cover lens, with a web of this right cover lens, not shown, into the groove filled with adhesive of the right headlight housing already in the tacker position 24. The second workpiece holder 12 positioned in the tacker position 24 serves on the one hand as an abutment for the two aforementioned second workpieces 10 during their bonding by the adhesive. On the other hand, this second workpiece holder 12 also has at least one tacker tool by means of which, in addition to the adhesive bond, the aforementioned right cover lens is positively connected to the aforementioned right headlight housing, namely by means of a plurality of tacker needles.

The two second workpieces 10, which are interconnected in the manner described above, are then transported from the tacker position 24 to the buffer station 30 by the first robot 2 and its handle 3. As soon as one of the two function test stations 26 is free, the first robot 2 uses its handle 3 to transport these two interconnected second workpieces 10 from the buffer station 30 to the free function test station 26. After an electrical and optical function test in this function test station 26, the first robot 2 uses its handle 3 to transport the two interconnected second workpieces 10 from this function test station 26 to the leak test station 28 for a leak test. Since the leak test takes considerably less time than the aforementioned function test, two function test stations 26 are provided in the present embodiment of the apparatus according to the invention. However, this is not mandatory, but is suitably configured by the person skilled in the art depending on the requirements of the individual case.

After the leak test is completed, the first robot 2 uses its handle 3 to transport the two interconnected second workpieces 10 from the leak test station 28 to the loading position 34 of the second conveyor belt 32 and deposits the two interconnected second workpieces 10 on the second conveyor belt 32. By means of the second conveyor belt 32, the two interconnected second workpieces 10 are transported from this loading position 34 to the unloading position 36, from where the user 22 can remove the two interconnected second workpieces 4, namely the right headlight formed by the interconnected right headlight housing and the right cover lens.

For the sake of clarity, only the run of a single right headlight has been shown as an example. Analogous to the left headlight, in reality, however, the individual transport processes, the connection of two mutually corresponding second workpieces 10, namely mutually corresponding right headlight housings and right cover lenses, as well as the testing of the respectively connected second workpieces 10 for mutually different pairs of second workpieces 10 take place essentially at the same time. Accordingly, depending on the requirements of the individual case, as is also the case in the present exemplary embodiment, only two function test stations 26 are required, for example, with only a single leak test station 28 and one buffer station 30.

The invention is not limited to the present exemplary embodiment. For example, the apparatus according to the invention and the method according to the invention for the operation thereof can also be used advantageously for other workpieces and products. It is included in the invention that by means of the apparatus according to the invention and the method according to the invention an almost arbitrary number, within the technical limits, of different workpieces and thus products can be processed in each case in a processing operation of the apparatus, since the changeover operation of the apparatus according to the invention can be applied to an almost arbitrary number, within the technical limits, of n workpieces which differ from each other, i.e. at least one first workpiece, at least one second workpiece, at least one third workpiece and so on up to at least one nth workpiece. The scalability in the invention also has the further advantage that, as an alternative to the exemplary embodiment, the left and right headlights of one type of automobile can be processed without the apparatus processing changeover. For this purpose, it can be advantageously provided that the first robot and the second robot each have a tool holder designed as a multiple holder for a plurality of tools which differ from one another. The multiple holder can then hold different tools for the left headlight and for the right headlight at the same time. Of course, the use of the multiple holders is not limited to the processing of left and right headlights in a single processing operation of the apparatus.

Furthermore, the invention includes that the at least one second workpiece holder of the apparatus can be replaced by the at least one first workpiece holder by means of the changeover operation of the apparatus.

It is also conceivable that the second robot for processing the at least one first workpiece and the at least one second workpiece has a processing tool instead of a positioner designed as a handle, by means of which the respective processing is carried out. For example, the second robot could have a processing tool designed as an adhesive application tool, with which the adhesive is then filled into the groove of the left or right headlight housing in the desired manner.

Instead of at least one tacker tool being integrated in the first or second workpiece holder positioned at the tacker position, it is also possible for a tacker robot to be used alternatively or additionally thereto. Also, alternatively or in addition to the two aforementioned embodiments of the tacker position, a user can manually tack with a tacker tool.

In other embodiments of the invention, it may also be provided that the at least one first workpiece and the at least one second workpiece are not complementary to each other. For example, it is possible that by means of a single apparatus according to the invention and a single method according to the invention, first and second workpieces for products which are fundamentally different from one another are processed. The invention can thus be used for very different products, workpieces and processing scenarios.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus comprising:
   a first robot to handle at least one first workpiece in a first processing operation of the apparatus;
   a second robot cooperating with the first robot to process the at least one first workpiece in the first processing operation; and
   at least one first workpiece holder to hold the at least one first workpiece during the first processing operation,
   wherein the first robot is configured to handle at least one second workpiece, and
   wherein the second robot is configured to process the at least one second workpiece in a second processing operation of the apparatus, and
   wherein the first robot and/or the second robot are configured in order, in a changeover operation of the apparatus, to replace the at least one first workpiece holder automatically by at least one second workpiece holder to hold the at least one second workpiece during the second processing operation.

2. The apparatus according to claim 1, wherein the second robot is additionally designed and configured for handling the at least one first workpiece and/or the at least one second workpiece.

3. The apparatus according to claim 1, wherein the first robot and/or the second robot has/have a tool holder designed to be interchangeable so as to accommodate tools which differ from one another.

4. The apparatus according to claim 1, wherein the first robot and/or the second robot have/has a tool holder designed as a multiple holder for a plurality of tools which differ from one another.

5. The apparatus according to claim 2, wherein the apparatus has a separate processing tool for processing the at least one first workpiece in the first processing operation and the at least one second workpiece in the second processing operation, and the second robot has at least one tool designed as a positioner, wherein the second robot is adapted to use the positioner to statically or dynamically position the at least one first workpiece in the first processing operation and the at least one second workpiece in the second processing operation relative to the processing tool for processing by the processing tool.

6. The apparatus according to claim 5, wherein the positioner has a frame, which in the first processing operation encloses at least one of the at least one first workpieces and in the second processing operation encloses at least one of the at least one second workpieces.

7. The apparatus according to claim 1, wherein the first robot and the second robot are mutually positioned in such a way that in the first processing operation and/or the second processing operation and/or the changeover operation, the first robot and the second robot occupy at least partially the same base area when viewed from a bird's-eye view.

8. The apparatus according to claim 7, wherein the first robot and the second robot are designed and configured in such a way that, in the first processing operation and/or the second processing operation and/or the changeover operation, the first robot operates over the second robot or the second robot operates over the first robot.

9. The apparatus according to claim 1, wherein the first robot and/or the second robot is/are designed and configured in such a way that the at least one first workpiece holder and/or the respective tool holder and/or the respective tool is/are automatically fed to a user for a user action during the first processing operation and/or the at least one second workpiece holder and/or the respective tool holder and/or the respective tool during the second processing operation and/or the respective tool holder and/or the respective tool during the changeover operation.

10. A method for operating an apparatus, the method comprising:
    automatically handling at least one first workpiece by a first robot;
    automatically processing the at least one first workpiece by a second robot cooperating with the first robot;
    holding the at least one first workpiece by at least one first workpiece holder during a first processing operation of the apparatus;
    automatically replacing, during a changeover operation of the apparatus, the at least one first workpiece holder by at least one second workpiece holder by the first and/or the second robot; and
    automatically handling at least one second workpiece by the first robot;
    automatically processing the at least one second workpiece by the second robot cooperating with the first robot; and
    holding the at least one second workpiece by the at least one second workpiece holder during a second processing operation of the apparatus.

11. The method according to claim 10, wherein the second robot additionally handles the at least one first workpiece and/or the at least one second workpiece using a handle of the second robot.

12. The method according to claim 10, wherein, via the second robot, the at least one first workpiece in the first processing operation and the at least one second workpiece in the second processing operation is/are positioned statically or dynamically relative to a separate processing tool of the apparatus for processing by the processing tool.

13. The method according to claim 10, wherein the first robot and the second robot are operated in the first processing operation and/or the second processing operation and/or the changeover operation in such a manner that the first robot and the second robot occupies at least partially the same base area when viewed from a bird's eye view.

14. The method according to claim 13, wherein the first robot and the second robot are operated in the first processing operation and/or the second processing operation and/or the changeover operation in such a manner that the first robot operates over the second robot or the second robot operates over the first robot.

15. The method according to claim 10, wherein the first robot and/or the second robot automatically feed a user for a user action, the at least one first workpiece holder and/or the respective tool holder and/or the respective tool during the first processing operation and/or the at least one second workpiece holder and/or the respective tool holder and/or the respective tool during the second processing operation and/or the respective tool holder and/or the respective tool during the changeover operation.

\* \* \* \* \*